A
United States Patent [19]

Breillatt, Jr.

[11] 3,723,244

[45] Mar. 27, 1973

[54] FIBROUS FIBRIN SHEET AND METHOD FOR PRODUCING SAME

[75] Inventor: Julian P. Breillatt, Jr., Oak Ridge, Tenn.

[73] Assignee: The United States of America as represented by the United States Atomic Energy Commission

[22] Filed: Jan. 18, 1971

[21] Appl. No.: 107,382

[52] U.S. Cl. ............162/151, 128/156, 128/325, 128/335.5, 264/311, 424/14, 424/15, 424/28, 162/384

[51] Int. Cl. ..................................D21h 5/20

[58] Field of Search ......162/151, 143, 384; 106/124, 106/161; 128/156, 325, 335.5; 424/14, 15, 27, 28; 264/311; 260/112 R, 112 B

[56] References Cited

UNITED STATES PATENTS

| 3,617,443 | 11/1971 | Chleq | 162/384 X |
|---|---|---|---|
| 3,210,241 | 10/1965 | Grauss et al. | 162/384 X |
| 3,036,341 | 5/1962 | Taylor | 264/311 X |
| 3,014,024 | 12/1961 | Lieberman et al. | 264/311 X |
| 2,533,004 | 12/1950 | Ferry et al. | 128/156 X |
| 2,992,882 | 7/1961 | Besso et al. | 106/124 X |
| 2,385,802 | 10/1945 | Ferry | 106/124 |
| 3,523,807 | 8/1970 | Gerendas | 128/335.5 X |

OTHER PUBLICATIONS

Harvey, "The Use of Fibrin Paper and Forms in Surgery," Boston Medical and Surgical Journal; Vol. 174, No. 18; pp. 658–59, May 4, 1916.

*Primary Examiner*—S. Leon Bashore
*Assistant Examiner*—Frederick Frei
*Attorney*—Roland A. Anderson

[57] ABSTRACT

Fibrin in sheet form is prepared by centrifuging an aqueous dispersion of monomeric fibrin under fibrin-polymerizing conditions. The centrifugation is conducted in a vessel having a wall for intercepting centrifuged particles and at a speed pelletizing the resulting strands of polymerized fibrin thereon. The pelletized strands interlock to form a fibrous sheet, which is removed from the vessel.

8 Claims, 1 Drawing Figure

FIBROUS FIBRIN SHEET AND METHOD FOR PRODUCING SAME

BACKGROUND OF THE INVENTION

This invention was made in the course of, or under, a contract with the united States Atomic Energy Commission.

Human fibrin is an immunologically neutral body protein which is finding increasing application as a research tool and a therapeutic material. For example, U.S. Pat. No. 3,523,807 describes a process wherein a mixture of powdered human fibrin and water is molded to form a shaped prosthetic appliance; after treatment with a cross-linking agent, the appliance is used in surgical procedures. U.S. Pat. No. 2,385,802 describes the production of plastics by mixing powdered fibrinogen with a plasticizer, molding the resulting mixture, and setting the molded article by heat. U.S. Pat. No. 2,385,803 relates to preparing protein plastics by mixing powdered fibrinogen with a selected protein and a plasticizer, and setting the resulting mixture under heat and pressure. British Patent 866,628 relates to the preparation of collagen films by centrifuging an aqueous acid dispersion of collagen fibers in a basket centrifuge lined with a filter medium. The centrifuge is operated at a speed distributing the dispersion over the face of the filter and then at a speed expelling the dispersing liquid through the filter. The collagen fibers trapped on the face of the filter form a removable film.

Sheet material containing fibrin is especially suitable for certain applications. In surgery, for instance, sheets containing preformed fibrin foam mixed with thrombin are used to promote hemostasis. Fibrin films produced by pressing and flattening blood clots have been used for platelet function tests. Fibrin in sheet form also may find use as a dressing for burns, a membrane for the retention of body fluids, and a substrate for the growth of cells.

The known methods of forming fibrin-containing sheets are tedious and are not well adapted for the production, on a reproducible basis, of sheets having a closely controlled thickness and a comparatively large area.

It is, therefore, an object of this invention to provide an improved method for the production of fibrin in the form of sheets.

It is another object of this invention to provide a method for reproducibly producing fibrin sheets, said method providing close control of the thickness of said sheets.

It is another object to provide a method for producing fibrin in the form of sheets having a comparatively large area.

It is another object to provide fibrin in the form of a sheet of interlocked fibrin fibers extending generally in the plane of the sheet.

Other objects of this invention will be made apparent hereinafter.

SUMMARY OF THE INVENTION

An aqueous dispersion of monomeric fibrin molecules is centrifuged under fibrin-polymerizing conditions. The centrifugation is conducted in a vessel having a wall for interception of particles undergoing centrifugal acceleration therein and at a speed pelletizing on said wall the strands of fibrin resulting from the polymerization. The pelletized strands interlock to form a sheet, which is subsequently recovered. The recovered sheet comprises interlocked fibrin fibers which extend generally in the plane of the sheet.

BRIEF DESCRIPTION OF THE DRAWING

The single FIGURE is a photomicrograph (total magnification: 30,000X) of an interior portion of a fibrin sheet produced in accordance with this invention. The portion shown in the FIGURE was obtained by sectioning the sheet along planes parallel to the faces of the sheet.

DESCRIPTION OF THE PREFERRED EMBODIMENTS

In the preferred form of my invention, an aqueous dispersion of monomeric fibrin molecules is centrifuged under fibrin-polymerizing conditions in a high-speed, bowl-type rotor of comparatively large volume. One such rotor is the so-called B–XV rotor described in detail in the following reference: Anderson, N. G., et al, "Analytical Techniques for Cell Fractionations V: Characteristics of the B-XIV and B-XV Zonal Centrifuge Rotors," Analytical Biochemistry 21, 235 (1967). Another suitable rotor is the Ti-15 design (Beckman Instruments, Inc.). These rotors contain radially oriented partitions, or septa, which are secured to the rotor core and extend close to the rotor wall. The rotors need not, however, be provided with septa to accomplish the purposes of this invention.

The above-mentioned dispersion of monomeric fibrin may be provided in various forms known to the art. It may, for example, be in the form of a volume of whole blood plasma, or a selected fraction thereof, in which monomeric fibrin is being formed as a result of induction of the blood-clotting reaction. As another illustration, it may be in the form of an aqueous solution of purified fibrinogen and a divalent alkaline earth cation (e.g., $Ca^{++}$, $Mg^{++}$) containing a sufficient quantity of a protolytic enzyme (e.g., thrombin, trypsin) to induce the fibrinogen-to-monomeric-fibrin reaction. Preferably, the pH of the solution in which the monomeric fibrin is being formed is adjusted to a value in the range of about 5.5 to 10.5, if it is not already in that range, in order to promote the ensuing polymerization of monomeric fibrin molecules. The formation of monomeric and polymerized fibrin is discussed in various texts, such as The Plasma Proteins, Vol. II, New York: Academic Press, 1960.

The following is a general illustration of my method as applied to the preparation of fibrin sheet from fresh-frozen human plasma which has been treated with a calcium-complexing agent, such as sodium citrate, to inhibit fibrin formation during storage. Citrated plasma is thawed and then is centrifuged at a comparatively low speed to remove cryoglobulins, which otherwise would deposit in the product sheet. Removal of the cryoglobulins is conducted at temperatures in the region of 5°C, since at higher temperatures the cryoglobulins become soluble. The resulting clarified, cool plasma is then treated to induce the normal blood-clotting reaction. This may be accomplished by the addition of calcium ions, as by the addition of an aqueous solution of calcium chloride or calcium acetate. The calcium ions are added somewhat in excess of the amount required to saturate the available citrate calcium-binding sites. As is well known in the art, this addition of calcium induces the formation of monomeric fibrin molecules; normally, these molecules combine promptly by polymerization to form insoluble fibrin strands which in turn combine to form a gel, or clot. The rate of polymerization of the monomeric fibrin is temperature dependent and is relatively low at temperatures from just above the freezing point of the mixture to, say, 5°C.

Following the reaction-inducing procedure just described, the plasma is loaded into the centrifuge rotor, and the latter is spun at pelletizing speed while polymerization is taking place. The term "pelletizing speed" as used here refers to a speed of centrifugation generating sufficient centrifugal force to pelletize, or deposit, on the rotor wall the fibrin strands formed by polymerization. To avoid gelling of the plasma, I prefer to retard the polymerization reaction initially by maintaining the plasma at a temperature in a first selected range; I maintain this temperature from the time that clotting is induced as described until the centrifuge rotor is in the region of the pelletizing speed. I prefer to conduct the pelletizing operation itself at a temperature in a second selected range higher than said first range in order to accelerate the polymerization reaction forming the fibrin strands. This can be accomplished conveniently by permitting the plasma to warm to the second selected temperature as the rotor approaches pelletizing speed. Although I increase the temperature of the plasma to promote polymerization during pelletizing, gelling is negligible because of the separative effect of the centrifugal field. In other words, the blood-clotting reaction is taking place while the rotor is at pelletizing speed, but the usual blood clot is not produced because of the action of the centrifugal field.

During pelletizing I maintain the plasma below the temperature at which fibrin denatures appreciably. In the typical pelletizing operation, considerable heat is imparted to the plasma from the rotor wall; consequently, during pelletizing I prefer to cool the plasma as required to maintain its temperature above about 15°C and below about 55°C. At temperatures below about 15°C the pelletizing time required to form sheets is impractically long. At temperatures above about 55°C, denaturing of the protein occurs to an objectionable extent.

At pelletizing speed, the polymerized fibrin strands are impelled upon the rotor wall, where they form a layer and interlock by mechanical and perhaps chemical interaction to form a continuous sheet. Some monomeric fibrin particulates also will be pelletized on the wall, and most of these will polymerize in place in the course of the pelletizing operation, becoming an integral part of the resulting sheet. The pelletizing operation is continued for a period sufficient to form a sheet of the desired thickness, as predetermined empirically or by calculation.

Following the centrifuge operation, the rotor is emptied. The above-mentioned sheet is recovered from the rotor wall, as by peeling it away from the rotor. The recovered sheet, which normally is flexible, comprises a loose mesh, or fabric, of fibrin fibers which extend generally in the plane of the sheet. When prepared as just described, the sheet contains certain non-aggregated, non-polymerized proteins—such as serum globulins and albumin—which sediment into the sheet during the centrifugation operation. These can be removed, if desired, by washing with various selective solvents. The fibrin sheet produced as described can be used immediately or can be stored. Preferably, it is stored in 0.85 weight percent sodium chloride solution, distilled water, or some other compatible liquid maintained at a temperature retarding bacterial growth.

The following is a more specific illustration of my process and the product obtained thereby.

EXAMPLE I

Fresh-frozen citrated human blood plasma was thawed at 4°C. Cryoglobulins were removed from the plasma by a comparatively low-speed centrifugation (conducted at 1,500 rpm in a swinging-bucket rotor having a diameter of about 10 inches). The clotting reaction then was induced by stirring 34 ml of M $CaCl_2$ into 1,125 ml of the centrifuged plasma, the latter being at about 4°C. (At 4°C the clotting reaction goes to completion in roughly 48 hours.) The resulting mixture was promptly loaded into a B-XV rotor having a removable seal permitting loading during rotation. The loading operation was conducted at 3,000 rpm and at about 8°C. After loading, the plasma was overlaid with an isotonic saline solution to displace air from the rotor. The rotor speed then was increased to maximum value ($\approx$28,000 rpm) and maintained at approximately this value for a period of 28 hours; thus, during this period the plasma was subjected to a total pelletizing force ($\omega^2 t$) of about $8.6 \times 10^{11}$ sec$^{-1}$. During the initial part of the centrifugation the plasma was permitted to warm to 15°C, and it was maintained at this temperature by cooling for the remainder of the run. At the end of the run, the liquid and the septa were removed from the rotor.

Examination of the rotor revealed that the material pelletized on the wall during centrifugation had formed a thin, integral sheet which was co-extensive with the rotor wall. This sheet, or film, was peeled from the wall in the form of a transparent, flexible cylinder. After storage for 12 hours in 0.85 percent sodium chloride solution, the sheet measured 56 cm. in circumference, 7.5 cm. in height, and 0.016 cm. in thickness. It was noted that the sheet swelled somewhat and became increasingly opaque while exposed to the storage medium. As shown in the accompanying FIGURE, the unstressed sheet comprised a loose mesh of fibers which occupied less than half the volume of the sheet. The surface of the fabric was smooth and amorphous, as observed by both scanning electron microscopy and light microscopy. The typical fibrin fiber was oriented in the plane of the sheet—that is, comparatively few fibers were oriented transversely with respect to the plane of the sheet. It was noted that the typical fiber was not flat, but wavy; this accounts for some of the apparent discontinuities in the fibers shown in the accompanying FIGURE, since the sheet was sectioned along a plane parallel to the faces of the sheet. The sheet was of highly uniform thickness, as would be expected from centrifugal deposition on a uniform wall.

The tensile properties of the fibrin sheet, or fabric, were determined with a commercial machine (Model TTCL, Instron Corporation, Canton, Mass.). The ultimate stress was found to be 880 lbs/in². The stress-strain curve was similar to that of an elastomer.

It is not essential that cryoglobulins be removed from the plasma prior to the pelletizing operation. They may, if desired, be left in the plasma, in which case they will be deposited on the rotor wall during centrifugation and will in large part be incorporated in the resulting sheet. If desired, they may be removed from the fibrin sheet by washing the sheet in a suitable solution, as in 25°C aqueous 0.85 percent sodium chloride.

EXAMPLE II

A B–XV rotor was loaded by successive introduction of the following through the edge line of the rotor: (1) 100 ml of saline overlay, (2) a mixture of 1,000 ml of clarified plasma and 30 ml of 1 M $CaCl_2$, (3) 540 ml of 20 percent sucrose aqueous solution. As the rotor was brought to pelletizing speed, the sucrose solution formed an annular band, or layer, isolating the plasma from the rotor wall. Pelletizing of the polymerized fibrin strands was effected generally as described, with the exception that the band of sucrose solution retarded the sedimentation of non-aggregated, non-polymerized (i.e., lower-mass) proteins, such as albumin and serum globulins, so that comparatively few of them reached the rotor wall.

The sheet removed from the rotor wall was generally similar to that obtained in Example I, being a transparent, flexible, uniform cylinder having essentially the same dimensions. The sheet comprised a loose mesh of interlocked fibrin fibers, the fibers being oriented generally in the plane of the sheet and occupying less than half the volume of the sheet. As compared with sheets produced in similar runs conducted without a sucrose band, there was a marked reduction in the content of the comparatively low-mass proteins, such as non-aggregated albumin and serum globulins.

As mentioned, the dispersion of monomeric fibrin may be in various forms, including an aqueous solution of purified fibrinogen wherein the fibrinogen-to-monomeric-fibrin reaction has been induced. The dispersion also may be in the form of fresh blood plasma in which that reaction is taking place, although stringent precautions must be taken during processing to avoid massive coagulation. My process is not limited to the production of fibrin sheet from human plasma but is applicable to other animal plasmas as well. It is well known that the clotting process is essentially the same in the various animal plasmas. The fibrin sheets produced from various solutions in which the fibrinogen-to-monomeric-fibrin reaction is taking place are generally similar and in most instances are suitable for use in the same applications. The sheets may not be identical, however. For example, unless certain agents such as cysteine are present, fibrin produced from fibrinogen and thrombin is urea-soluble because of the absence of the usual fibrin-stabilizing factor.

Referring to the rotor used to centrifuge the dispersion of monomeric fibrin, I prefer to employ a rotor of the bowl type. Such rotors lend themselves to the production of sheets of various configurations; for example, the bowl can be dimensioned to yield a fibrin sheet which after cutting transversely is a square. A long bowl-type rotor of small radius can be used to produce the fibrin sheet in the form of tubing. My method can, however, be conducted in a sector-shaped vessel adapted to be swung about an axis.

It is typical for the deposited fibrin sheet to conform to the configuration of the rotor wall, and thus the sheet formed in a standard bowl-type rotor is a smooth-faced cylinder, or sleeve, of essentially uniform thickness. If desired, however, the rotor wall may be configured or patterned to form a product sheet having a special surface or shape. Furthermore, the rotor may be provided with a liner, such as loosely woven cellulose, into the interstices of which the centrifuged fibrin will be pelletized, forming a composite structure characterized by enhanced strength or other special characteristics.

Referring to the processing of plasma in which clotting has been prevented by an inhibitor, the clotting reaction may be induced by the addition of an effective amount of various calcium compounds (other than the citrate) which are soluble in the plasma. As is well known, the cations of various divalent alkaline earths may be so used. Induction also may be effected by addition of thrombin or other appropriate protolytic enzymes. If desired, induction may be deferred until the plasma is loaded into the centrifuge rotor while the latter is either stationary or rotating. Normal fresh plasma contains sufficient calcium ions for the clotting reaction to begin almost immediately. The wording "-plasma in which the fibrinogen-to-monomeric fibrin reaction has been induced" is used herein to include fresh plasma or a fresh plasma fraction maintained under conditions (e.g., a suitable temperature) permitting that reaction to take place.

Referring to the pelletizing operation, it will be understood that the pelletizing speed as defined above encompasses a range of speeds. I have found that pelletizing fields exceeding about 20,000 g are effective in producing fibrin sheets in a practical time. It will be understood that, if desired, the rotor speed may be varied during the course of a pelletizing operation. The length of time that the rotor is operated at pelletizing speed depends on such parameters as the diameter of the rotor, the volume of plasma in the rotor, the temperature of the plasma, and the sheet thickness desired. Even the highest centrifuge speeds now obtainable, such as those reached with analytical centrifuges, are suitable.

As mentioned, the product sheet may be stored by suspending it in various solutions. I have found that the fracture load for samples of my sheet stored in saline solution for seven days is about twice that for similar samples stored in distilled water for the same period. My fibrin sheets have been dried at room temperature and then rehydrated, with apparent retention of their initial elasticity and strength.

It was pointed out about that certain non-aggregated, non-polymerized proteins (e.g., serum globulins) will sediment into the fibrin sheet during pelletization and that these can be removed in a modified form of my method wherein the plasma is subjected to zonal centrifugation (see The Development of Zonal Centrifuges, National Cancer Institute Monograph 21, June 1966). In another form of my method utilizing zonal centrifugation, the fibrin strands centrifugally accelerated toward the rotor wall are sedimented through one or more zones of liquid reagents selected to modify the properties of the strands before they are pelletized on the wall (see U.S. Pat. No. 3,519,400, to N. G. Anderson). It will also be understood that the fibrin sheet formed on the rotor wall may be modified by various chemical treatments, either in situ or after removal from the wall.

It will be apparent that my method for producing fibrin sheet is highly reproducible, since both the dispersion being centrifuged and the conditions for centrifugation can be standardized to yield virtually identical products from run to run.

Having thus described my invention, I claim:

1. The method of producing fibrin in sheet form which comprises the steps of centrifuging an aqueous dispersion of fibrin wherein monomeric fibrin molecules are combining by polymerization to form strands of fibrin, said centrifuging step being conducted in a vessel having a wall for interception of particles undergoing centrifugal acceleration therein and at a speed pelletizing on said wall the strands of fibrin resulting from polymerization, wherein the strands so pelletized interlock to form a sheet, and recovering the resulting sheet from said wall.

2. The method of claim 1 wherein said aqueous dispersion comprises whole blood plasma.

3. The method of claim 1 wherein said aqueous dispersion comprises a blood plasma.

4. The method of claim 1 wherein said aqueous dispersion is provided in the form of an aqueous solution of purified fibrinogen, a divalent alkaline earth cation, and a small but effective amount of a catalyst for the fibrinogen-to-monomeric-fibrin reaction.

5. The method of claim 1 wherein said aqueous dispersion is at a pH in the range of 5.5 to 10.5.

6. The method of claim 1 wherein said centrifuging step is conducted at a temperature in the range of 15° to 55° C.

7. The method of claim 1 wherein said centrifuging step is conducted at a speed generating a pelletizing force of at least 20,000 g.

8. A sheet of fibrin produced by the process of claim 1.

* * * * *